US009949267B2

(12) United States Patent
Carnevale et al.

(10) Patent No.: US 9,949,267 B2
(45) Date of Patent: Apr. 17, 2018

(54) VEHICLE TELEMATICS SERVICES IN COORDINATION WITH A HANDHELD WIRELESS DEVICE

(71) Applicant: General Motors LLC, Detroit, MI (US)

(72) Inventors: Marco T. Carnevale, Windsor (CA); Nathaniel H. Williams, Berkley, MI (US); Swee Meng Yong, Canton, MI (US); Yue Zhuang, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/261,611

(22) Filed: Sep. 9, 2016

(65) Prior Publication Data

US 2018/0077712 A1     Mar. 15, 2018

(51) Int. Cl.
  *H04W 72/04* (2009.01)
  *H04W 4/02* (2009.01)
  *H04L 29/08* (2006.01)
  *H04W 88/02* (2009.01)
  *H04W 64/00* (2009.01)

(52) U.S. Cl.
  CPC ......... *H04W 72/0473* (2013.01); *H04W 4/02* (2013.01); *H04W 4/023* (2013.01); *H04L 67/12* (2013.01); *H04W 64/006* (2013.01); *H04W 88/02* (2013.01)

(58) Field of Classification Search
  CPC ....... H04W 4/008; H04W 4/02; H04W 4/021; H04W 4/023; H04W 4/043; H04W 4/025; H04W 4/028; H04W 64/006; H04W 72/0473; H04W 88/02; H04L 67/12
  See application file for complete search history.

(56) References Cited

U.S. PATENT DOCUMENTS

| | | | | |
|---|---|---|---|---|
| 2008/0153515 A1* | 6/2008 | Mock | ..................... | G01C 21/20 455/456.5 |
| 2009/0043490 A1* | 2/2009 | Jung | ....................... | G01S 19/14 701/533 |
| 2012/0054028 A1* | 3/2012 | Tengler | .............. | G01C 21/3697 705/14.49 |
| 2014/0344728 A1* | 11/2014 | Tuukkanen | ........ | G01C 21/3664 715/763 |
| 2016/0112846 A1* | 4/2016 | Siswick | ................. | H04B 17/27 455/456.4 |

* cited by examiner

*Primary Examiner* — Daniel Lai
(74) *Attorney, Agent, or Firm* — David Willoughby; Reising Ethington P.C.

(57) ABSTRACT

A system and method of performing vehicle navigation services in coordination with a handheld wireless device that involves determining a vehicle location at a vehicle using a vehicle telematics unit of the vehicle; identifying a plurality of points-of-interest (POIs) within a predetermined range of the vehicle location; detecting a vehicle occupant has exited the vehicle; sending an instruction from the vehicle that directs a handheld wireless device associated with the vehicle occupant or the vehicle to begin generating location data; and receiving the location data from the handheld wireless device.

19 Claims, 2 Drawing Sheets

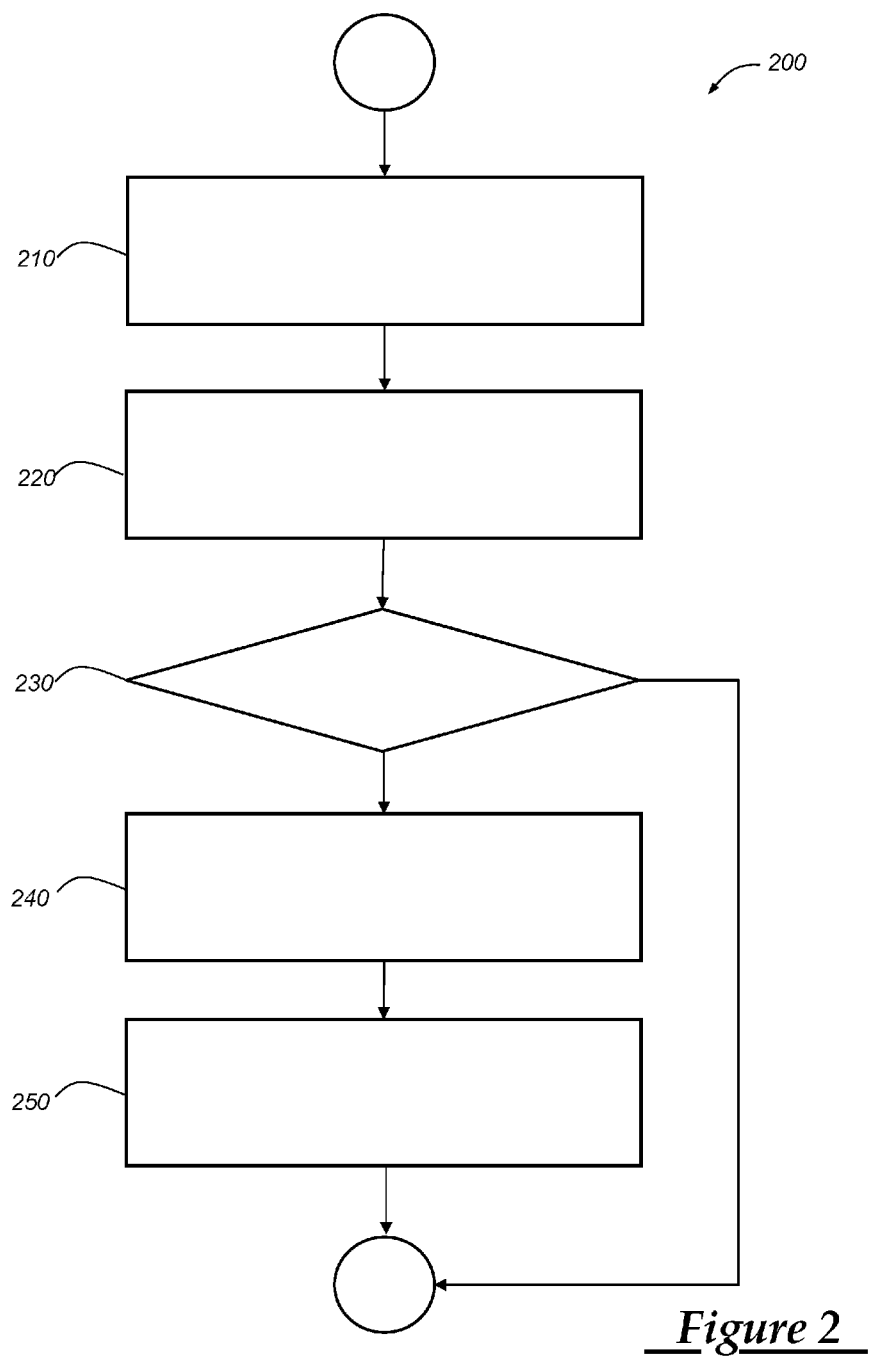

VEHICLE TELEMATICS SERVICES IN COORDINATION WITH A HANDHELD WIRELESS DEVICE

TECHNICAL FIELD

The present invention relates to vehicles and, more particularly, to vehicles that provide navigational services to vehicle occupants.

BACKGROUND

Vehicles often include vehicle telematics units that can identify a vehicle location and communicate that location to vehicle occupants. As the vehicle travels, the vehicle telematics unit can determine the location of the vehicle and identify the location on a map generated by a visual display. However, when the vehicle stops, the vehicle may be parked near a large number of closely-located destinations. The vehicle may have difficulty determining which of these destinations the vehicle occupant will visit given that the destinations may be a significant distance from where the vehicle is parked, the destinations may be closely clustered together, or both.

Handheld wireless devices can include an ability to provide navigational services as well. However, the navigational functionality of the handheld wireless devices may consume significant amounts of power thereby increasing the battery depletion rate for those devices. As a result, the navigational functionality of the handheld wireless devices may not be carried out for extended periods of time.

SUMMARY

According to an embodiment of the invention, there is provided a method of performing vehicle navigation services in coordination with a handheld wireless device. The method includes determining a vehicle location at a vehicle using a vehicle telematics unit of the vehicle; detecting a vehicle occupant has exited the vehicle; sending an instruction from the vehicle that directs a handheld wireless device associated with the vehicle occupant or the vehicle to begin generating location data; and receiving the location data from the handheld wireless device.

According to another embodiment of the invention, there is provided a method of performing vehicle navigation services in coordination with a handheld wireless device. The method includes determining a vehicle location at a vehicle using a vehicle telematics unit of the vehicle; identifying a plurality of points-of-interest (POIs) within a predetermined range of the vehicle location; predicting that a handheld wireless device associated with the vehicle or a vehicle occupant will travel toward one of the plurality of the identified POIs; determining if the prediction is above a confidence threshold; detecting the vehicle occupant has exited the vehicle; and sending an instruction that directs the handheld wireless device to begin generating location data in response to step (e) when the prediction is determined to be below the confidence threshold.

According to yet another embodiment of the invention, there is provided a method of performing vehicle navigation services in coordination with a handheld wireless device. The method includes receiving, at a central facility, a vehicle location generated by a vehicle telematics unit of the vehicle; identifying a plurality of points-of-interest (POIs) within a predetermined range of the vehicle location; predicting that a handheld wireless device associated with the vehicle or a vehicle occupant will travel toward one of the plurality of the identified POIs; determining if the prediction is above a confidence threshold; receiving a message from the vehicle indicating that the vehicle occupant has exited the vehicle; sending an instruction from the central facility to the handheld wireless device directing the handheld wireless device to begin generating location data when the prediction is determined to be below the confidence threshold; receiving location data at the central facility from the handheld device; and selecting one of the identified POIs based on the location data received from the handheld device.

BRIEF DESCRIPTION OF THE DRAWINGS

One or more embodiments of the invention will hereinafter be described in conjunction with the appended drawings, wherein like designations denote like elements, and wherein:

FIG. 2 is a flow chart depicting an embodiment of a method of performing vehicle navigation services in coordination with a handheld wireless device.

DETAILED DESCRIPTION OF THE ILLUSTRATED EMBODIMENT(S)

Figure 1:
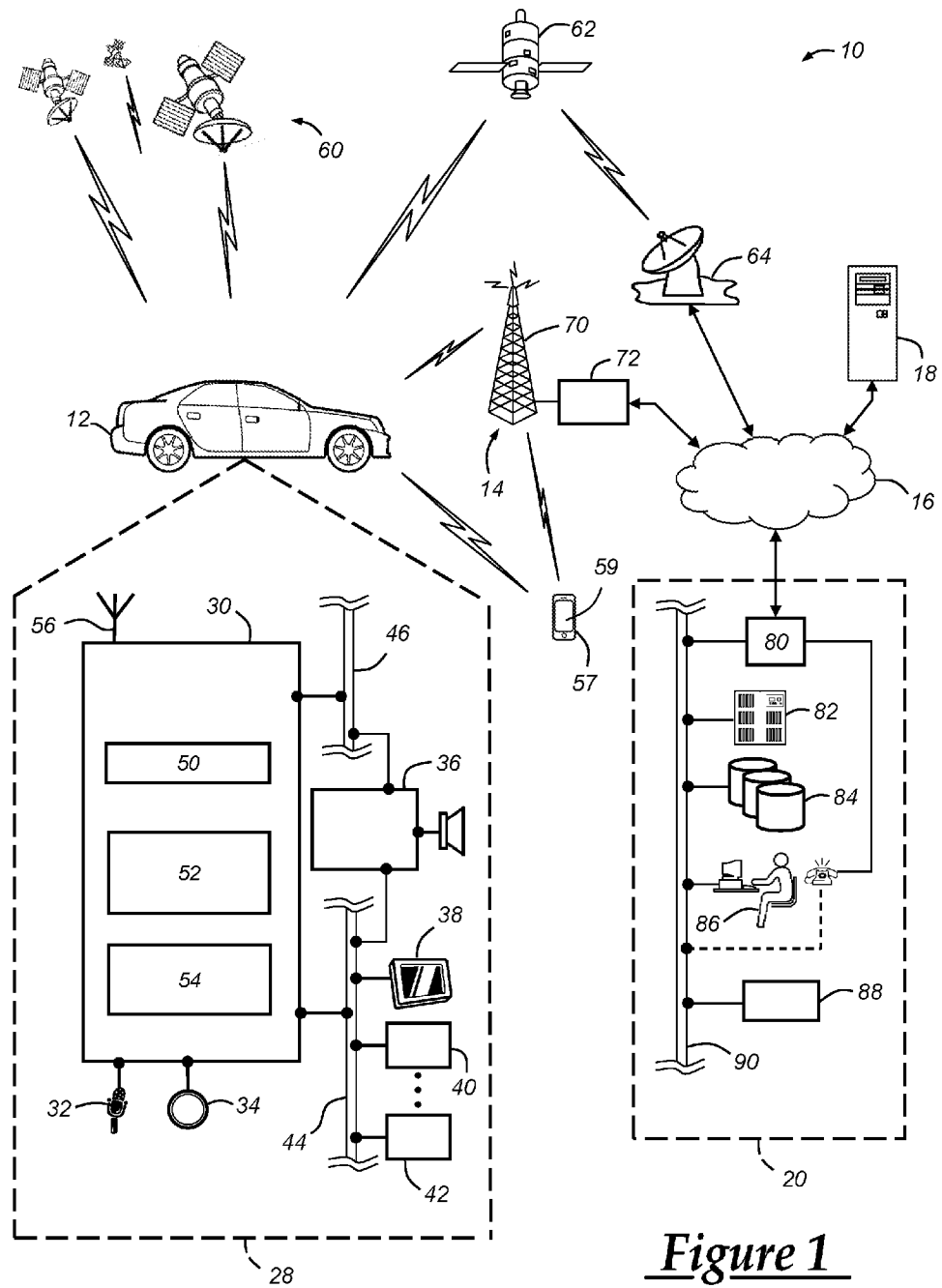
FIG. 1 is a block diagram depicting an embodiment of a communications system that is capable of utilizing the method disclosed herein.

The system and method described below selectively uses a handheld wireless device associated with a vehicle or vehicle occupant to identify the location of a point of interest (POI) from among a plurality of POIs located nearby a parked vehicle. The vehicle or a central facility can selectively direct the handheld wireless device to activate and deactivate its navigational functionality so that when carried by a vehicle occupant after parking the vehicle to one of a plurality of relatively densely-clustered POIs, the handheld wireless device can more finely resolve which POI the vehicle occupant visits. In some environments, the vehicle or central facility can confidently predict which POI of the plurality of POIs the vehicle occupant will visit. The vehicle can then conclude that it does not need input from the handheld wireless device to identify which POI will be visited by the vehicle occupant. On the other hand, if the vehicle or central facility cannot confidently predict which of the plurality of POIs the vehicle occupant will visit, the vehicle can detect the vehicle occupant exiting the vehicle and wirelessly transmit an instruction to the handheld wireless device instructing it to begin monitoring its location. After the vehicle occupant has left the vehicle, the handheld wireless device can generate location data while the vehicle occupant moves toward the plurality of POIs. When the vehicle occupant visits one of those POIs, the handheld wireless device can record the location. This location, as well as the route the vehicle occupant traveled while away from the vehicle, can be wirelessly sent to a central facility or to the vehicle when the vehicle occupant returns with the handheld wireless device. The central facility can record this vehicle occupant's route, which can be used for predicting POI selection in the future. After returning to the vehicle, the handheld wireless device can be instructed to stop monitoring location thereby reducing the power consumed by the device.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth™, or near field communication (NFC). When used for packet-switched data communication such as TCP/IP, the telematics unit can be configured with a static IP address or can be set up to automatically receive an assigned IP address from another device on the network such as a router or from a network address server.

One of the networked devices that can communicate with the telematics unit 30 is a handheld wireless device, such as a smart phone 57. The smart phone 57 can include computer processing capability, a transceiver capable of communicating using a short-range wireless protocol, and a visual smart phone display 59. The smart phone 57 typically includes a GPS module capable of receiving GPS satellite signals and generating GPS coordinates based on those signals. The smart phone 57 also includes one or more microprocessors that execute machine code to generate logical output. Examples of the smart phone 57 include the iPhone manufactured by Apple and the Galaxy manufactured by Samsung, as well as others. While the smart phone 57 may include the ability to communicate via cellular communications using the wireless carrier system 14, this is not always the case. For instance, Apple manufactures devices such as the various models of the iPad and iPod Touch that include the processing capability, the display 59, the GPS module, and the ability to communicate over a short-range wireless communication link. However, the iPod Touch™ and some iPads™ do not have cellular communication capabilities. Even so, these and other similar devices may be used or considered a type of handheld wireless device, such as the smart phone 57, for the purposes of the method described herein.

The handheld wireless devices can be attributed to a vehicle occupant in a number of ways. For example, the smart phone 57 can be paired with the vehicle 12 via short-range wireless communication protocols or by storing a handheld wireless device identifier, such as a mobile equipment identifier (MEID), at the vehicle 12. The smart phone 57 can also be associated with a vehicle occupant in a database at a central facility. The vehicle 12 can receive this association from the central facility when needed. The vehicle occupants discussed can include vehicle owners, vehicle lessors, or other people who ride in or drive the vehicle 12 to a location and exit the vehicle 12 to travel to a nearby POI when the vehicle 12 is parked.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Turning now to FIG. 2, there is shown an implementation of a method (200) of performing vehicle navigation services in coordination with a handheld wireless device. In this implementation, the handheld wireless device will be described in terms of the smart phone 57 discussed above. But it should be understood that other types of handheld devices, such as tablets, could also be used with the methods described herein. The method 200 begins at step 210 by determining a vehicle location at the vehicle 12 using the vehicle telematics unit 30 of the vehicle 12. The GPS module 40 of the vehicle telematics unit 30 can receive signals transmitted by the GPS satellite constellation 60 and based on those signals determine a latitude and longitude coordinate position representing the vehicle location. The latitude and longitude position can then be provided to a map matching software module that identifies the latitude and longitude position on electronic maps that include the position. The electronic maps can include data that identifies points-of-interest (POIs) by location as well as the directional and distance relationship between the POIs themselves and between POIs and the vehicle location.

POIs can generally be described as destinations a vehicle occupant walks to after parking the vehicle 12. For example, a shopping mall may have a large parking lot where vehicle occupants park a large number of vehicles. The shopping mall usually includes restaurants and retail stores that vehicle occupants visit after leaving the vehicle in the parking lot. Each of these restaurants or retail stores can each be considered a separate POI. In another example, an airport may be considered to be a POI that is located within a range of one or more parking facilities where vehicle occupants leave their vehicles before boarding flights. Other commercial enterprises that are located adjacent the airport can also be identified as POIs, such as hotels and gas stations. Strip malls may generally be made up of linearly arranged storefronts with commercial businesses having outdoor entrances adjacent a parking lot. And each of the storefronts/commercial businesses in the strip mall may be identified as individual POIs. The method 200 proceeds to step 220.

At step 220, a plurality of POIs within a predetermined range of the vehicle location are identified. Once the vehicle 12 has been parked in a lot, the vehicle telematics unit 30 or a central facility can identify a plurality of POIs located in close proximity to each other as well as to the vehicle 12. The central facility can be implemented using the computer 18, the call center 20, or other similar facility having computer resources that is able to receive data messages. The predetermined range can be established as a maximum distance a vehicle occupant may be considered likely to walk from the vehicle 12 after parking. It is possible to generate the maximum distance using consumer surveys in which vehicle occupants identify the furthest distance they have walked from the vehicle 12. Or a central facility can receive location data from handheld wireless devices that have been carried by vehicle occupants riding in a large number of vehicles. When the vehicle occupants leave the vehicle 12, the smart phones can record how far the vehicle occupants walk. This data can then be processed to determine a maximum value or 90th percentile value that establishes the predetermined range within which POIs can be identified. The vehicle telematics unit 30 can determine the latitude and longitude coordinates of the vehicle 12 when it is parked, access the predetermined range within which the vehicle telematics unit 30 may search for nearby POIs, and then identify all of the POIs within the predetermined range. The predetermined range can be used to establish a geofence around the vehicle 12 within which nearby POIs are identified. As discussed above, the electronic map data can be used to identify POIs near the vehicle location where the vehicle is parked. The method 200 proceeds to step 230.

At step 230, the vehicle 12 or the central facility predicts whether the smart phone 57 associated with the vehicle 12 or a vehicle occupant will travel toward one of the plurality of the identified POIs. This prediction can be carried out in different ways. In one implementation, the vehicle telematics unit 30 can access a database log stored in the memory device 54 and compare the identified POIs with previously-visited POIs stored in the database log. The database log can include POI identity and location information received from the smart phone 57 after previous visits to POIs when away from the vehicle 12. If the vehicle telematics unit 30 matches one of the POIs within the predetermined range of the vehicle location with a previously-visited POI in the database log, the vehicle telematics unit 30 can determine, with a high confidence level, that the vehicle occupant plans to visit that POI again. Or in another example, the vehicle telematics unit 30 can determine that the database log includes the name of a chain restaurant as a POI the vehicle occupant visited previously, but visited at a vehicle location that is different from where the vehicle 12 is presently located. The vehicle telematics unit 30 can then determine, with a high confidence level, that the vehicle occupant plans to visit the POI because he previously visited it at another location. It is also possible to configure the vehicle telematics unit 30 to give some POIs a high confidence value even if they have not been previously-visited. For example, if the vehicle telematics unit 30 identifies an airport among a plurality of POIs, the unit 30 can determine with a high-confidence level that the vehicle occupant intends to visit the airport rather than the other POIs identified. Vehicular information gathered at the vehicle 12 can also be used to determine which of the identified POIs the vehicle occupant plans to visit. For example, vehicle fuel levels can be used to indicate with a high degree of confidence that the vehicle occupant plans to visit a fuel station.

When the vehicle telematics unit 30 determines that it knows which of the identified POIs the vehicle occupant plans to visit with a high confidence level, the vehicle telematics unit 30 can provide navigational directions to that POI. The vehicle telematics unit 30 can sent turn-by-turn directions to the smart phone 57 via a short-range wireless communications protocol, such as Bluetooth, or can provide the latitude/longitude coordinates of the POI. When the vehicle telematics unit 30 determines with a high level of confidence that it has identified the POI the vehicle occupant will visit, the method 200 ends. Otherwise, the vehicle telematics unit 30 may not be able to determine which of the identified POIs the vehicle occupant plans to visit with a high level of confidence. This lack of confidence can result from a determination that none of the identified POIs are found in the database log; or if one or more of the POIs are found in the database log, the vehicle occupant visits each of the POIs with equal frequency. The method 200 proceeds to step 240.

At step 240, the vehicle 12 detects the vehicle occupant exiting the vehicle 12. The vehicle telematics unit 30 can wait until the vehicle occupant exits the vehicle 12 to begin gathering information about which POI the vehicle occupant plans to visit. The vehicle 12 can receive signals from one or more VSMs 42 to make this determination. These VSMs include the body control module with can indicate that a vehicle door has been opened or that a vehicle ignition has been turned off. Detection of the exit from or entrance to the vehicle 12 can be used to trigger the navigational or position-rendering functionality of the smart phone 57. This can help manage the power consumption of this functionality thereby preserving charge in its battery. The method 200 proceeds to step 250.

At step 250, an instruction is sent to the smart phone 57 directing it to begin generating location data in response to the vehicle occupant exiting the vehicle 12. The vehicle telematics unit 30, after detecting the exit of the vehicle occupant from the vehicle 12, can generate a computer readable instruction commanding the smart phone 57 to begin recording location data. This command can also include a list of the nearby identified POIs that the smart phone 57 can compare with its present location. As the smart phone 57 moves within the geofence or within the determined range, the smart phone 57 can record its movement and provide that movement to the computer 18. Or in another implementation, the vehicle telematics unit 30 can receive the location information from the smart phone 57 via a cellular communication connection or a short-range wireless link. When the vehicle occupant visits POIs, those POIs can be identified and stored in the database log for future predictions regarding which POIs will be visited. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of performing vehicle telematics services in coordination with a handheld wireless device, comprising the steps of:

(a) determining a vehicle location at a vehicle using a vehicle telematics unit of the vehicle;
(b) detecting a vehicle occupant has exited the vehicle;
(c) sending an instruction from the vehicle that directs a handheld wireless device associated with the vehicle occupant or the vehicle to begin generating location data in response to step (b);
(d) identifying a plurality of points-of-interest (POIs) within a predetermined range of the vehicle location; and
(e) receiving the location data from the handheld wireless device;
wherein step (c) is carried out in response to detecting that the vehicle occupant has exited the vehicle and that the mobile device is travelling toward one of the plurality of the identified POIs.

2. The method of claim 1, wherein at least some of the location data is stored in a database log that includes previously-visited POIs.

3. The method of claim 1, further comprising the step of generating the predetermined range based on information received from a plurality of handheld wireless devices.

4. The method of claim 1, wherein the vehicle occupant is detected leaving the vehicle based on a door opening or a vehicle ignition off event.

5. The method of claim 1, wherein the vehicle sends the instruction via a short-range wireless communication protocol.

6. The method of claim 1, wherein the location data is received at the vehicle.

7. The method of claim 1, wherein the location data is received at a central facility.

8. A method of performing vehicle telematics services in coordination with a handheld wireless device, comprising the steps of:
(a) determining a vehicle location at a vehicle using a vehicle telematics unit of the vehicle;
(b) identifying a plurality of points-of-interest (POIs) within a predetermined range of the vehicle location;
(c) predicting that a handheld wireless device associated with the vehicle or a vehicle occupant will travel toward one of the plurality of the identified POIs;
(d) determining if the prediction is above a confidence threshold;
(e) detecting the vehicle occupant has exited the vehicle; and
(f) sending an instruction that directs the handheld wireless device to begin generating location data in response to step (e) when the prediction is determined to be below the confidence threshold.

9. The method of claim 8, further comprising the step of determining whether the vehicle location is associated with one or more previously-received POIs stored in a database log.

10. The method of claim 8, wherein at least some of the location data is stored in a database log that includes previously-visited POIs.

11. The method of claim 8, further comprising the step of generating the predetermined range based on information received from a plurality of handheld wireless devices.

12. The method of claim 8, wherein the vehicle occupant is detected leaving the vehicle based on a door opening or a vehicle ignition off event.

13. The method of claim 8, wherein the vehicle sends the instruction via a short-range wireless communication protocol.

14. A method of performing vehicle telematics services in coordination with a handheld wireless device, comprising the steps of:
(a) receiving, at a central facility, a vehicle location generated by a vehicle telematics unit of the vehicle;
(b) identifying a plurality of points-of-interest (POIs) within a predetermined range of the vehicle location;
(c) predicting that a handheld wireless device associated with the vehicle or a vehicle occupant will travel toward one of the plurality of the identified POIs;
(d) determining if the prediction is above a confidence threshold;
(e) receiving a message from the vehicle indicating that the vehicle occupant has exited the vehicle;
(f) sending an instruction from the central facility to the handheld wireless device in response to step (e) directing the handheld wireless device to begin generating location data when the prediction is determined to be below the confidence threshold;
(g) receiving location data at the central facility from the handheld device; and
(h) selecting one of the identified POIs based on the location data received from the handheld device.

15. The method of claim 14, wherein at least some of the location data is stored in a database log that includes previously-visited POIs.

16. The method of claim 14, further comprising the step of generating the predetermined range based on information received from a plurality of handheld wireless devices.

17. The method of claim 14, wherein the vehicle occupant is detected leaving the vehicle based on a door opening or a vehicle ignition off event.

18. The method of claim 14, further comprising the step of determining whether the vehicle location is associated with one or more previously-received POIs stored in a database log.

19. The method of claim 14, wherein the vehicle sends the instruction via a short-range wireless communication protocol.

* * * * *